United States Patent
Lee et al.

(10) Patent No.: US 11,127,368 B2
(45) Date of Patent: Sep. 21, 2021

(54) DATA TRANSMITTING SYSTEM AND DISPLAY APPARATUS HAVING THE SAME AND METHOD OF TRANSMITTING DATA USING THE SAME

(71) Applicant: Samsung Display Co., Ltd., Yongin-si (KR)

(72) Inventors: Whee-Won Lee, Busan (KR); JiYoung Eom, Yongin-si (KR); Subin Park, Hwaseong-si (KR); Jaewon Lee, Seoul (KR); JunPyo Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 102 days.

(21) Appl. No.: 16/298,074

(22) Filed: Mar. 11, 2019

(65) Prior Publication Data
US 2019/0287481 A1    Sep. 19, 2019

(30) Foreign Application Priority Data

Mar. 13, 2018 (KR) ........................ 10-2018-0029051

(51) Int. Cl.
*G06F 3/14* (2006.01)
*G09G 5/00* (2006.01)
*G09G 5/36* (2006.01)

(52) U.S. Cl.
CPC ........... *G09G 5/008* (2013.01); *G06F 3/1407* (2013.01); *G09G 5/363* (2013.01); *G09G 2350/00* (2013.01)

(58) Field of Classification Search
None
See application file for complete search history.

(56) References Cited

U.S. PATENT DOCUMENTS

| 7,167,111 | B2* | 1/2007 | Sulc | H04L 25/4906 |
| | | | | 341/58 |
| 7,634,694 | B2* | 12/2009 | Green | H04L 25/03866 |
| | | | | 714/701 |
| 8,085,172 | B2* | 12/2011 | Li | G06F 1/3253 |
| | | | | 341/58 |
| 9,722,824 | B2 | 8/2017 | Payne | |
| 2001/0040564 | A1* | 11/2001 | Yun | G09G 3/20 |
| | | | | 345/204 |

(Continued)

FOREIGN PATENT DOCUMENTS

| KR | 10-2012-0091858 A | 8/2012 |
| KR | 10-2017-0037774 A | 4/2017 |

*Primary Examiner* — Parul H Gupta
(74) *Attorney, Agent, or Firm* — Lewis Roca Rothgerber Christie LLP

(57) ABSTRACT

A data transmitting system includes a transmitter configured to transmit first unit data having a first bit length and second unit data sequentially with the first unit data and having the first bit length and a receiver configured to receive the first unit data and the second unit data. The transmitter is configured to transmit the second unit data to the receiver when a last bit of the first unit data and a first bit of the second unit data have different values and to invert the first bit of the second unit data and transmit the second unit data having the inverted first bit to the receiver when the last bit of the first unit data and the first bit of the second unit data have the same value.

18 Claims, 13 Drawing Sheets

(56) References Cited

U.S. PATENT DOCUMENTS

2003/0184343 A1\* 10/2003 Kuge ............. H03K 19/018592
326/86
2005/0040975 A1\* 2/2005 Kim ........................ H03M 5/04
341/58

\* cited by examiner

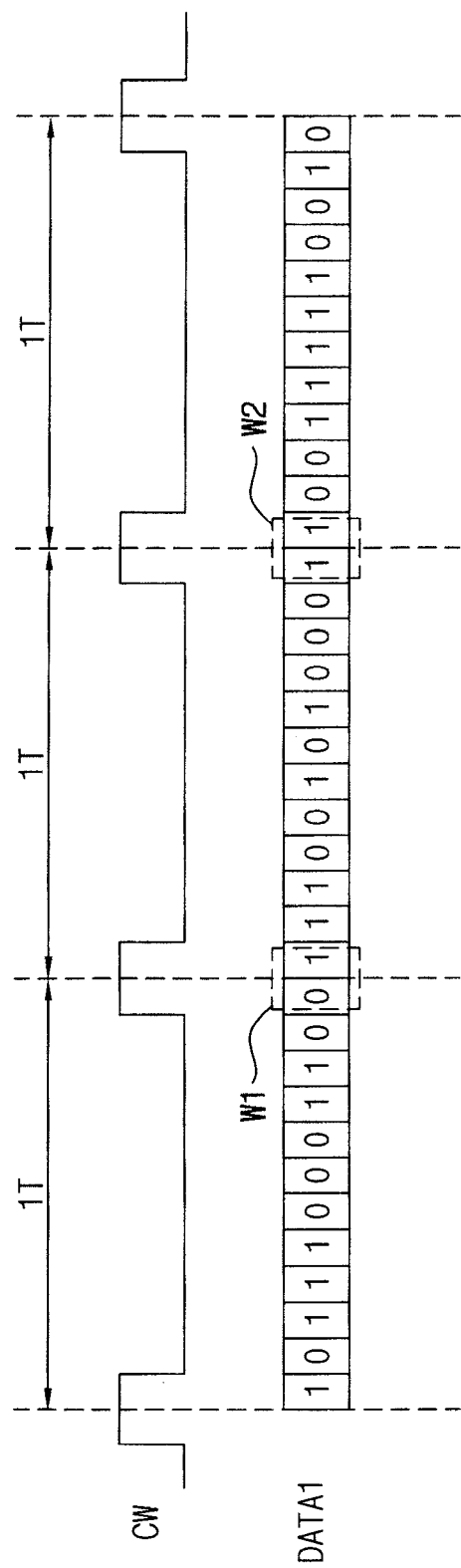

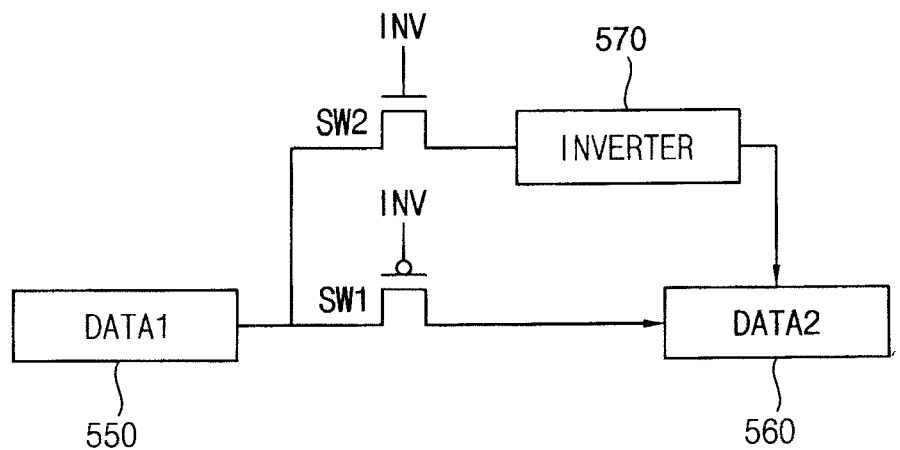
FIG. 9
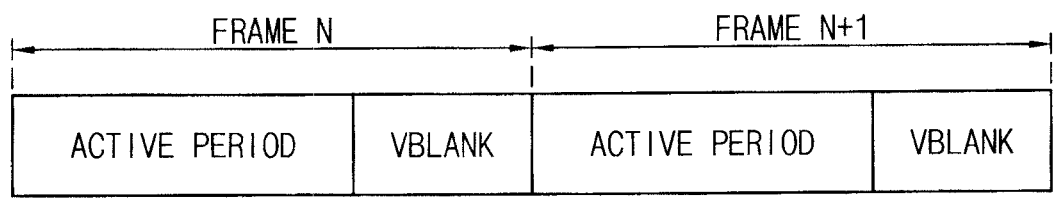

DATA TRANSMITTING SYSTEM AND DISPLAY APPARATUS HAVING THE SAME AND METHOD OF TRANSMITTING DATA USING THE SAME

CROSS-REFERENCE TO RELATED APPLICATION

This application claims priority to and the benefit of Korean Patent Application No. 10-2018-0029051, filed on Mar. 13, 2018 in the Korean Intellectual Property Office (KIPO), the content of which is herein incorporated by reference in its entirety.

BACKGROUND

1. Field

Aspects of exemplary embodiments of the present inventive concept relate to a data transmitting system, a display apparatus including the data transmitting system, and a method of transmitting data using the data transmitting system.

2. Description of the Related Art

A display apparatus generally includes a display panel and a display panel driver. The display panel may include a plurality of gate lines, a plurality of data lines, and a plurality of pixels. The display panel driver may include a gate driver, a data driver, and a timing controller. The gate driver may output gate signals to the gate lines, the data driver may output data voltages to the data lines, and the timing controller may control the gate driver and the data driver.

The timing controller may transmit the data signal to a plurality of blocks of the data driver by using a point-to-point data transmitting method to support high resolution and high frame rate display apparatuses. In the point-to-point data transmitting method, a clock embedded method of transmitting the data signal with a clock bit may be used to prevent a skew problem due to an increased frequency (e.g., due to the relatively high frequency).

SUMMARY

Aspects of exemplary embodiments of the present inventive concept provide a data transmitting system capable of transmitting data without an additional clock signal and/or an additional clock bit.

Aspects of exemplary embodiments of the present inventive concept also provide a display apparatus including the above-mentioned data transmitting system.

Aspects of exemplary embodiments of the present inventive concept also provide a method of transmitting data by using the above-mentioned data transmitting system.

In an exemplary embodiment of a data transmitting system according to the present inventive concept, the data transmitting system includes a transmitter and a receiver. The transmitter is configured to transmit first unit data having a first bit length and second unit data sequentially with the first unit data and having the first bit length. The receiver is configured to receive the first unit data and the second unit data. The transmitter is configured to transmit the second unit data to the receiver when a last bit of the first unit data and a first bit of the second unit data have different values and to invert the first bit of the second unit data and transmit the second unit data having the inverted first bit to the receiver when the last bit of the first unit data and the first bit of the second unit data have the same value.

In an exemplary embodiment, the transmitter may be configured to invert all bits of the second unit data and transmit the second unit data having the inverted bits to the receiver when the last bit of the first unit data and the first bit of the second unit data have the same value.

In an exemplary embodiment, the transmitter may be configured to invert only the first bit of the second unit data and transmit the second unit data having the inverted first bit to the receiver when the last bit of the first unit data and the first bit of the second unit data have the same value.

In an exemplary embodiment, the transmitter may be configured to output an inversion notifying signal notifying the receiver of the inversion of the second unit data to the receiver when the last bit of the first unit data and the first bit of the second unit data have the same value.

In an exemplary embodiment, the receiver may include a restoring circuit configured to restore the first bit of the second unit data when the first bit of the second unit data is inverted.

In an exemplary embodiment, the restoring circuit may include a first storing circuit configured to temporarily store the second unit data transmitted from the transmitter, a second storing circuit configured to store the restored second unit data, a first switch between the first storing circuit and the second storing circuit and configured to be turned on in response to an inactive level of the inversion notifying signal, a second switch between the first storing circuit and the second storing circuit and configured to be turned on in response to an active level of the inversion notifying signal, and an inverter between the second switch and the second storing circuit and configured to restore the first bit of the second unit data when the second switch is turned on.

In an exemplary embodiment, the receiver may be configured to generate a clock window signal having a window corresponding to the last bit of the first unit data and the first bit of the second unit data.

In an exemplary embodiment, the receiver may be configured to read the first unit data from the last bit of the first unit data to a first bit of the first unit data by using the first bit length using a delay locked loop circuit when the last bit of the first unit data and the first bit of the second unit data in the window have different values.

In an exemplary embodiment, the delay locked loop circuit may include a plurality of buffers connected with each other in series.

In an exemplary embodiment, the first unit data and the second unit data may be transmitted during an active duration. A vertical blank duration may be between two adjacent active durations. The clock window signal may be generated by a clock training pattern signal transmitted from the transmitter to the receiver during the vertical blank duration.

In an exemplary embodiment, a lock checking signal representing output of the clock training pattern signal and an inversion notifying signal notifying the receiver of the inversion of the second unit data may be generated as a single signal.

In an exemplary embodiment of a display apparatus according to the present inventive concept, the display apparatus includes a display panel, a gate driver, a data driver, and a timing controller. The display panel is configured to display an image. The gate driver is configured to output a gate signal to a plurality of gate lines of the display panel. The data driver is configured to output a data voltage to a plurality of data lines of the display panel. The timing controller is configured to output a first control signal to the gate driver and to output a second control signal and a data signal corresponding to the data voltage to the data driver. The timing controller is configured to transmit first unit data having a first bit length and second unit data sequentially with the first unit data and having the first bit length. The data driver is configured to receive the first unit data and the second unit data. The timing controller is configured to transmit the second unit data to the data driver when a last bit of the first unit data and a first bit of the second unit data have different values. The timing controller is configured to invert the first bit of the second unit data and transmit the second unit data having the inverted first bit to the data driver when the last bit of the first unit data and the first bit of the second unit data have the same value.

In an exemplary embodiment, the timing controller may be configured to not output a clock signal swinging between a high level and a low level to the data driver.

In an exemplary embodiment, the first unit data and the second unit data may not include a clock bit.

In an exemplary embodiment, the timing controller may be configured to output an inversion notifying signal notifying the data driver of the inversion of the second unit data to the data driver when the last bit of the first unit data and the first bit of the second unit data have the same value.

In an exemplary embodiment, the data driver may include a restoring circuit configured to restore the first bit of the second unit data when the first bit of the second unit data is inverted.

In an exemplary embodiment, the restoring circuit may include a first storing circuit configured to temporarily store the second unit data transmitted from the timing controller, a second storing circuit configured to store the restored second unit data, a first switch between the first storing circuit and the second storing circuit and configured to be turned on in response to an inactive level of the inversion notifying signal, a second switch between the first storing circuit and the second storing circuit and configured to be turned on in response to an active level of the inversion notifying signal, and an inverter between the second switch and the second storing circuit and configured to restore the first bit of the second unit data when the second switch is turned on.

In an exemplary embodiment of a method of transmitting data according to the present inventive concept, the method includes: comparing, by a transmitter, a last bit of first unit data having a first bit length to a first bit of second unit data output sequentially with the first unit data and having the first bit length; transmitting, by the transmitter, the first unit data to a receiver; when the last bit of the first unit data is different from the first bit of the second unit data, transmitting, by the transmitter, the second unit data to the receiver; and when the last bit of the first unit data is the same as the first bit of the second unit data, inverting, by the transmitter, the first bit of the second unit data and transmitting, by the transmitter, the second unit data having the inverted first bit to the receiver.

In an exemplary embodiment, the method may further include: transmitting, by the transmitter, a clock training pattern to the receiver before the comparing of the last bit of the first unit data to the first bit of the second unit data; and generating, by the receiver, a clock window signal having a window corresponding to the last bit of the first unit data and the first bit of the second unit data based on the clock training pattern.

In an exemplary embodiment, the method may further include: comparing, by the receiver, the last bit of the first unit data and the first bit of the second unit data in the window; determining, by the receiver, a boundary between the first unit data and the second unit data when the last bit of the first unit data and the first bit of the second unit data in the window are different from each other; reading, by the receiver, the first unit data based on the boundary between the first unit data and the second unit data; outputting, by the transmitter, an inversion notifying signal notifying the receiver of the inversion of the second unit data when the last bit of the first unit data is the same as the first bit of the second unit data; and restoring, by the receiver, the second unit data in response to the inversion notifying signal.

According to the data transmitting system, the display apparatus including the data transmitting system, and the method of transmitting data by using the data transmitting system, data may be transmitted without an additional clock signal and an additional clock bit.

The clock bits are omitted from the data used in a related art clock embedded method so that data bandwidth may be increased. In addition, the clock bits are omitted from the data used in the related art clock embedded method so that the power consumption due to data toggling may be reduced. In addition, the bandwidth of the data is increased so that the number of the driving blocks (e.g., driving ICs) of the data driver may be reduced. Thus, the manufacturing cost of the display apparatus may be reduced.

In addition, the clock bits are omitted from the data used in the related art clock embedded method from a data transmitting cycle viewpoint so that the frequency of data bits transmission may be decreased. Therefore, the wireless wide area network noise and the electromagnetic interference noise may be reduced. In addition, the clock bits are omitted from the data used in the related art clock embedded method from a data transmitting cycle viewpoint so that the frequency of data bits transmission may be decreased, the jitter margin may be improved, and/or the reliability of the data may be improved.

BRIEF DESCRIPTION OF THE DRAWINGS

The above and other features and aspects of the present inventive concept will become more apparent by describing, in more detail, exemplary embodiments thereof with reference to the accompanying drawings, in which:

FIG. 7A is a timing diagram illustrating a data signal, from which a clock bit is omitted, generated by a timing controller according to a related art example;

FIG. 8 is a block diagram illustrating a restoring part of the data driver shown in FIG. 1;

FIG. 9 is a conceptual diagram illustrating a frame structure of a data signal transmitted from a timing controller to a data driver of a display apparatus according to an exemplary embodiment;

DETAILED DESCRIPTION

Figure 1:
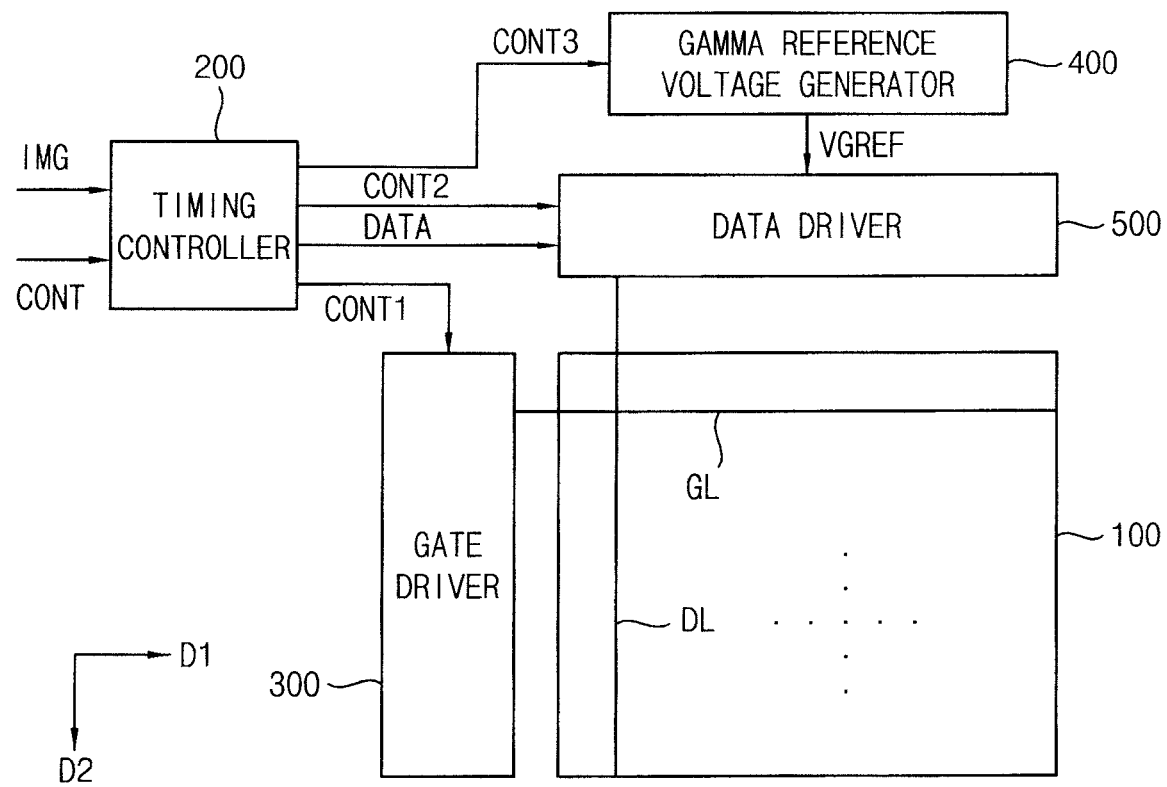
FIG. 1 is a block diagram illustrating a display apparatus according to an exemplary embodiment of the present inventive concept.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Also, the term "exemplary" is intended to refer to an example or illustration. As used herein, the terms "use," "using," and "used" may be considered synonymous with the terms "utilize," "utilizing," and "utilized," respectively. As used herein, the term "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The display panel driver and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the display panel driver may be formed on one integrated circuit (IC) chip or on separate IC chips. Further, the various components of the display panel driver may be implemented on a flexible printed circuit film, a tape carrier package (TCP), a printed circuit board (PCB), or formed on a same substrate as the display panel driver. Further, the various components of the display panel driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Hereinafter, example embodiments of the present inventive concept will be explained in more detail with reference to the accompanying drawings.

FIG. 1 is a block diagram illustrating a display apparatus according to an exemplary embodiment of the present inventive concept.

Referring to FIG. 1, the display apparatus includes a display panel 100 and a display panel driver. The display panel driver includes a timing controller 200, a gate driver 300, a gamma reference voltage generator 400, and a data driver 500.

The display panel 100 includes a display region and a peripheral region adjacent to (e.g., surrounding a periphery of) the display region.

The display panel 100 includes a plurality of gate lines GL, a plurality of data lines DL, and a plurality of pixels electrically connected to the gate lines GL and the data lines DL. The gate lines GL extend in a first direction D1, and the data lines DL extend in a second direction D2 crossing the first direction D1.

The timing controller 200 receives input image data IMG and an input control signal CONT from an external apparatus. The input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, and a data signal DATA based on the input image data IMG and the input control signal CONT.

The timing controller 200 generates the first control signal CONT1 for controlling operation of the gate driver 300 based on the input control signal CONT and outputs the first control signal CONT1 to the gate driver 300. The first control signal CONT1 may include a vertical start signal and a gate clock signal.

The timing controller 200 generates the second control signal CONT2 for controlling operation of the data driver 500 based on the input control signal CONT and outputs the second control signal CONT2 to the data driver 500. The second control signal CONT2 may include a horizontal start signal and a load signal.

The timing controller 200 generates the data signal DATA based on the input image data IMG. The timing controller 200 outputs the data signal DATA to the data driver 500.

The timing controller 200 generates the third control signal CONT3 for controlling operation of the gamma reference voltage generator 400 based on the input control signal CONT and outputs the third control signal CONT3 to the gamma reference voltage generator 400.

The gate driver 300 generates gate signals for driving the gate lines GL in response to the first control signal CONT1 received from the timing controller 200. For example, the gate driver 300 may sequentially output the gate signals to the gate lines GL.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level (e.g., a grayscale level or value) of the data signal DATA.

In an exemplary embodiment, the gamma reference voltage generator 400 may be disposed in (e.g., may be integral with) the timing controller 200 or disposed in (e.g., may be integral with) the data driver 500.

The data driver 500 receives the second control signal CONT2 and the data signal DATA from the timing controller 200 and receives the gamma reference voltages VGREF from the gamma reference voltage generator 400. The data driver 500 converts the data signal DATA into analog data voltages by using the gamma reference voltages VGREF. The data driver 500 outputs the data voltages to the data lines DL.

Figure 2:
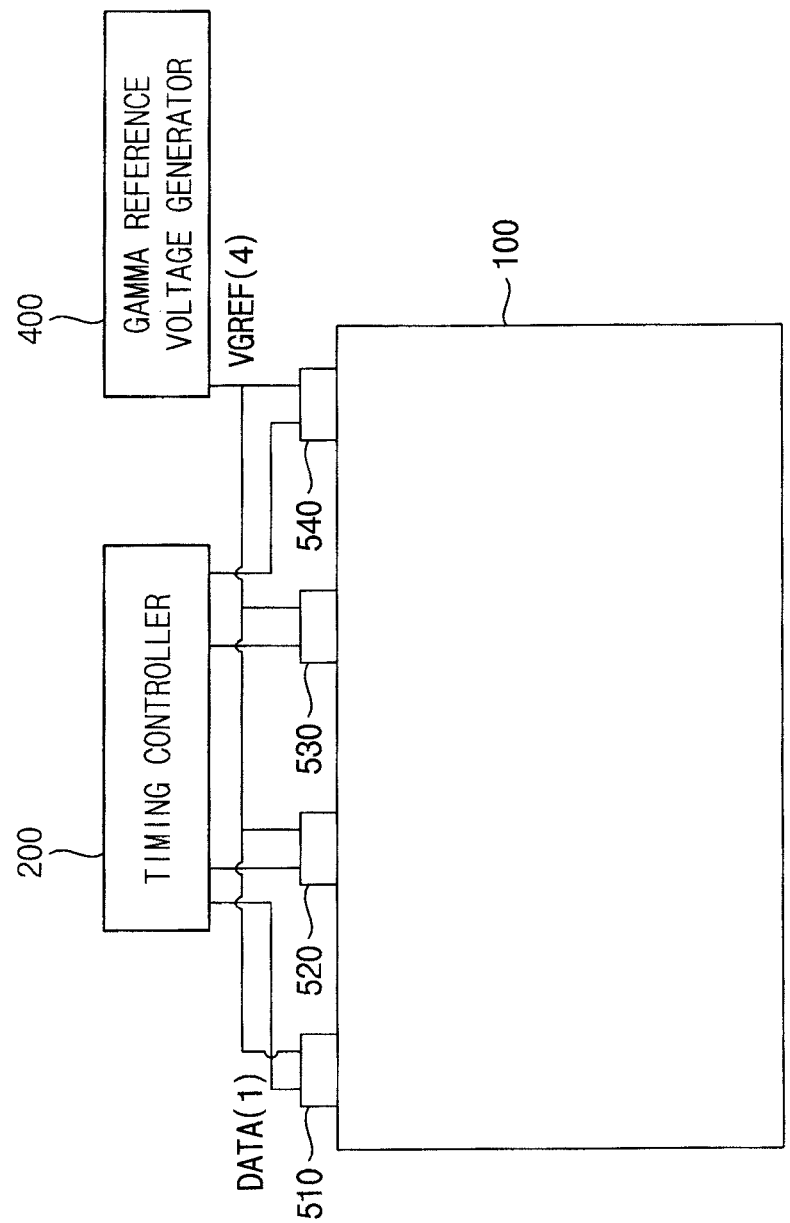
FIG. 2 is a block diagram illustrating data transmitting paths between a display panel, a timing controller, a gamma reference voltage generator, and a data driver shown in FIG. 1.

FIG. 2 is a block diagram illustrating data transmitting paths between the display panel 100, the timing controller 200, the gamma reference voltage generator 400, and the data driver 500 shown in FIG. 1.

Referring to FIGS. 1 and 2, the timing controller 200 outputs the data signal DATA to the data driver 500, and the gamma reference voltage generator 400 outputs the gamma reference voltage VGREF to the data driver 500.

Hereinafter, the data signal DATA may represent (or may refer to) an integrated signal including the data signal DATA and the second control signal CONT2 shown in FIG. 1 as well as the data signal DATA per se.

The data driver 500 may include a plurality of data driving blocks 510, 520, 530, and 540. For example, the data driving blocks 510, 520, 530, and 540 may be data driving integrated circuit (IC) chips.

The timing controller 200 may output the data signal DATA to the data driver 500 by using a point-to-point data transmitting method.

In embodiments of the present inventive concept, the timing controller 200 may be a transmitter, the data driver 500 may be a receiver, and the timing controller 200 and the data driver 500 may form a data transmitting system.

In FIG. 2, the numbers in parenthesis after DATA and VGREF may refer to the number of transmitting paths.

For example, the data signal DATA(1) may be transmitted by using one transmitting path. For example, when the data signal DATA(1) is transmitted in a differential mode, the one transmitting path of the data signal DATA(1) may include a pair of data signal transmitting lines.

For example, the gamma reference voltage generator 400 may transmit the gamma reference voltage VGREF(4) to the data driving blocks 510, 520, 530, and 540 by using four transmitting paths.

Figure 3:
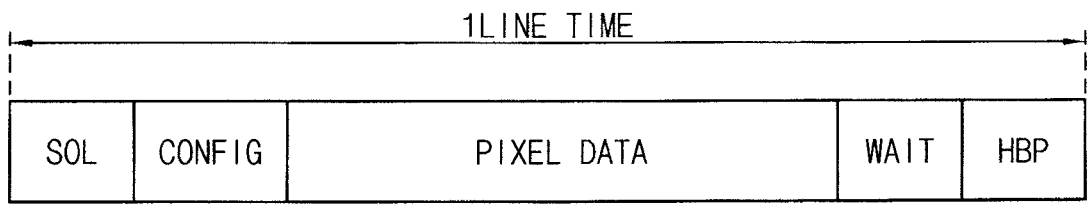
FIG. 3 is a conceptual diagram illustrating line data of a data signal transmitted from the timing controller to the data driver shown in FIG. 1.

FIG. 3 is a conceptual diagram illustrating line data of the data signal transmitted from the timing controller 200 to the data driver 500 shown in FIG. 1.

Referring FIG. 3, the data signal DATA may include frame data corresponding to all pixels of the display panel 100. The frame data may include line data corresponding to pixels connected to a single gate line of the display panel 100.

A data structure of the line data is illustrated in FIG. 3. The line data may include a line start signal output period SOL, a configuration signal output period CONFIG, a pixel data output period PIXEL DATA, a waiting period WAIT, and a horizontal blank period HBP.

Figure 4A:
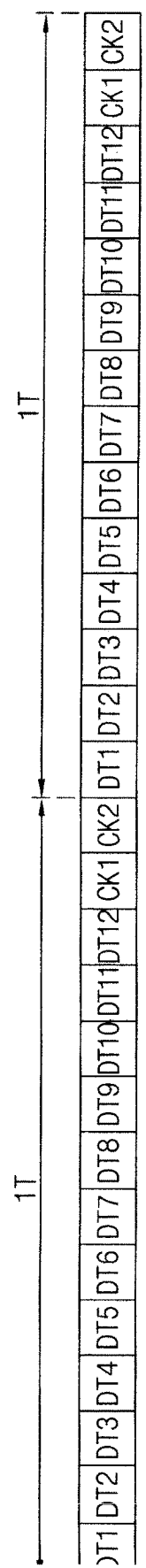
FIG. 4A is a conceptual diagram illustrating unit data of a data signal transmitted from a timing controller to a data driver according to a related art example.
Figure 4B:
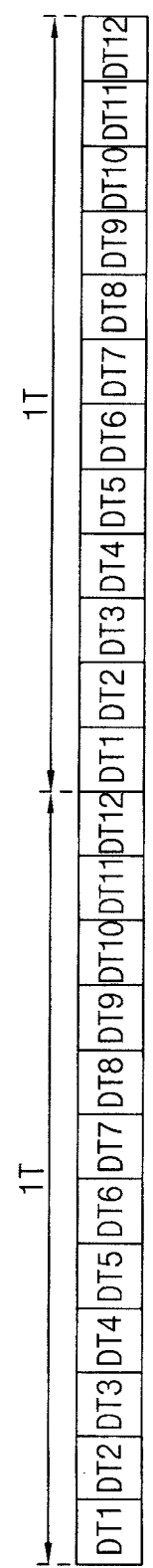
FIG. 4B is a conceptual diagram illustrating unit data of the data signal transmitted from the timing controller to the data driver shown in FIG. 1.

FIG. 4A is a conceptual diagram illustrating unit data of a data signal transmitted from a timing controller to a data driver according to a related art example. FIG. 4B is a conceptual diagram illustrating unit data of the data signal DATA transmitted from the timing controller 200 to the data driver 500 shown in FIG. 1.

The unit data of FIGS. 4A and 4B may correspond to the line data shown in FIG. 3 but does not include the line start signal output period SOL, the configuration signal output period CONFIG, the waiting period WAIT, or the horizontal blank period HBP. For example, the unit data shown in FIGS. 4A and 4B may correspond to the data of the pixel data output period PIXEL DATA.

In FIG. 4A, the unit data has a bit length 1T of fourteen bits. The unit data may include twelve data bits DT1 to DT12 and two clock bits CK1 and CK2. A timing controller may output the unit data to a data driver, and the data driver may read the twelve data bits DT1 to DT12 by using the clock bits CK1 and CK2.

In FIG. 4B, the timing controller 200 according to an exemplary embodiment omits the two clock bits CK1 and CK2 from the unit data and outputs the unit data other than the two clock bits CK1 and CK2 to the data driver 500. The data processing for the data signal omitting the clock bits CK1 and CK2 is further explained with reference to FIGS. 5-8.

Figure 5:
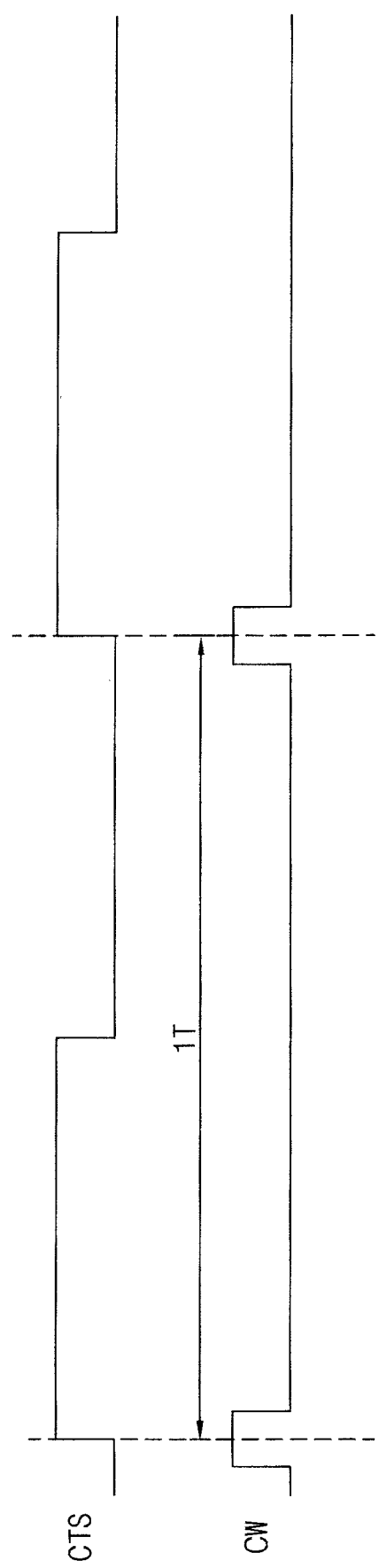
FIG. 5 is a timing diagram illustrating a process of generating a clock window signal by the data driver shown in FIG. 1.

FIG. 5 is a timing diagram illustrating a process of generating a clock window signal CW by the data driver 500 shown in FIG. 1.

Referring to FIGS. 1-3, 4B, and 5, the timing controller 200 may output a clock training signal CTS including a clock training pattern to the data driver 500. The clock training pattern may have a high duration and a low duration (e.g., a high state and a low state). The data driver 500 may learn the clock training pattern and may generate the clock window signal CW having a clock window corresponding to a rising edge of the clock training pattern.

When the data driver 500 generates the clock window signal CW, the data driver 500 may output a signal to the timing controller 200 notifying it of the generation of the clock window signal CW.

When the timing controller 200 receives the signal notifying it of the generation of the clock window signal CW from the data driver 500, the timing controller 200 may stop output of the clock training signal CTS.

Figure 6A:
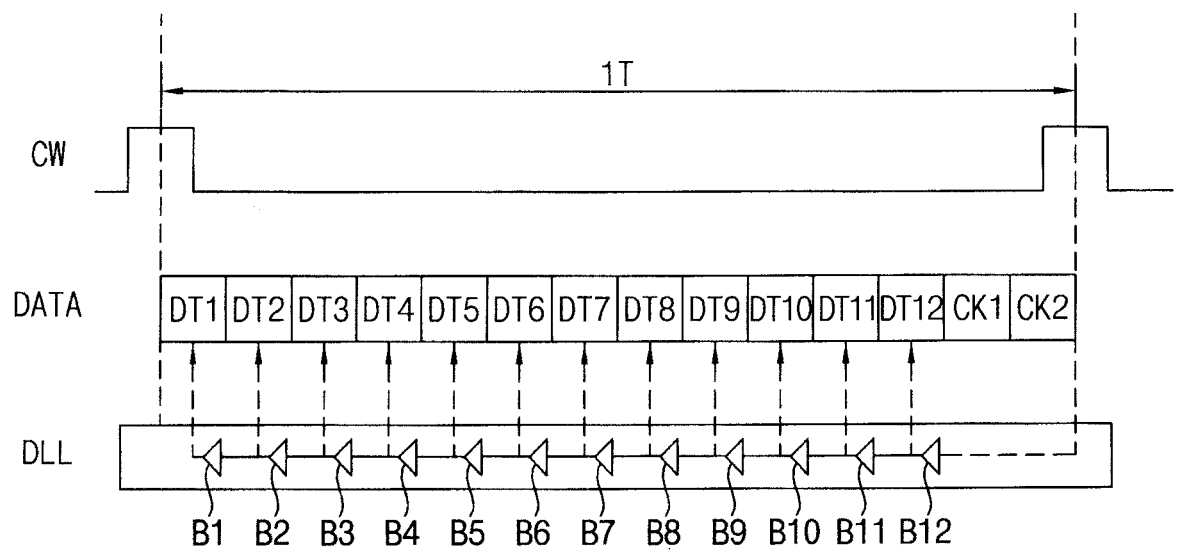
FIG. 6A is a conceptual diagram illustrating a process of reading a data signal by a data driver according to a related art example.
Figure 6B:
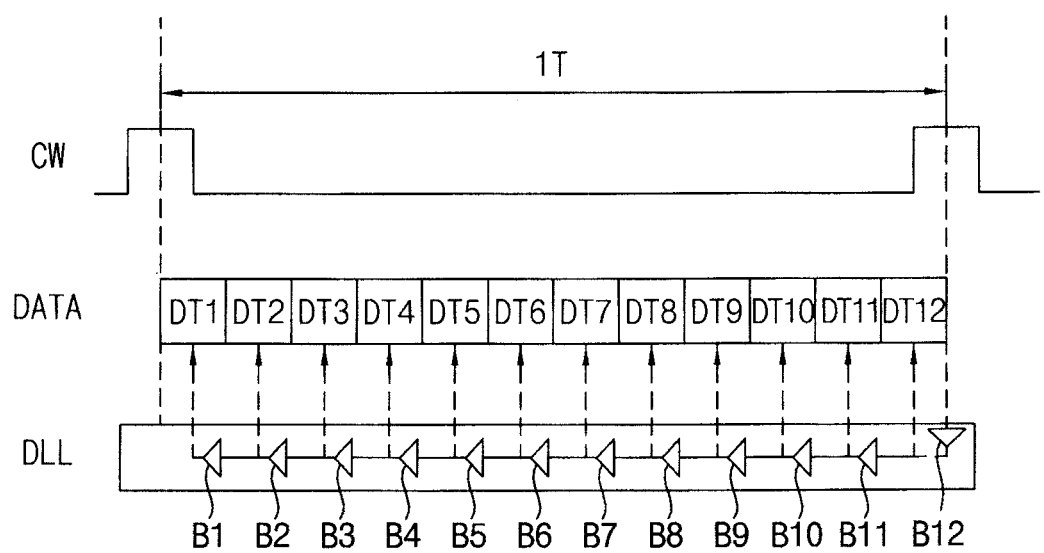
FIG. 6B is a conceptual diagram illustrating a process of reading the data signal by the data driver shown in FIG. 1.

FIG. 6A is a conceptual diagram illustrating a process of reading a data signal DATA by a data driver according to a related art example. FIG. 6B is a conceptual diagram illustrating a process of reading the data signal DATA by the data driver 500 shown in FIG. 1.

FIG. 6A represents the process of reading the data signal DATA by a data driver when the unit data includes the clock bits as explained with reference to FIG. 4A. FIG. 6B represents the process of reading the data signal DATA by the data driver 500 when the unit data does not include the clock bits as explained with reference to FIG. 4B.

In FIG. 6A, when two bits in the clock window of the clock window signal CW have different values, the data driver determines a first bit in the clock window as a second clock bit CK2. The data driver determines a start of the data bits in the unit data by using the second clock bit CK2.

In the related art example, the timing controller may generate the second clock bit CK2 to have a value different from a value of a first bit of next unit data.

The data driver may read the unit data from a last data bit DT12 of the unit data to a first data bit DT1 of the unit data by using a delay locked loop circuit DLL.

The delay locked loop circuit DLL may include a plurality of buffers B1 to B12 connected with each other in series. When the two bits in the clock window have different values, the data driver reads a twelfth data bit DT12 by using a twelfth buffer B12 of the delay locked loop circuit DLL.

After the data driver reads the twelfth data bit DT12, the data driver reads an eleventh data bit DT11 by using an eleventh buffer B11 of the delay locked loop circuit DLL. Then, the data driver sequentially reads a tenth data bit DT10, a ninth data bit DT9, an eighth data bit DT8, a seventh data bit DT7, a sixth data bit DT6, a fifth data bit DT5, a fourth data bit DT4, a third data bit DT3, a second data bit DT2, and the first data bit DT1 by using the delay locked loop circuit DLL. The data driver may determine a bit length 1T (e.g., fourteen bits in FIG. 6A) of the unit data by using the clock window signal CW.

In FIG. 6B, the unit data of the present exemplary embodiment does not include the clock bit(s), so the data driver 500 determines a first bit in the clock window as a twelfth data bit DT12 when two bits in the clock window of the clock window signal CW have different values.

When a first unit data and a second unit data are sequentially transmitted or received, the clock window of the clock window signal CW may be formed corresponding to (e.g., may include) a last bit of the first unit data and a first bit of the second unit data.

In the presently-described exemplary embodiment, the data driver 500 may determine a start of the data bits in the unit data by using the twelfth data bit DT12, which is determined by using the clock window.

The data driver 500 may read the unit data from a last data bit DT12 of the unit data to a first data bit DT1 of the unit data by a bit length 1T (e.g., twelve bits in FIG. 6B) of the unit data by using a delay locked loop circuit DLL.

The delay locked loop circuit DLL may include a plurality of buffers B1 to B12 connected with each other in series. When the two bits in the clock window have different values, the data driver 500 reads a twelfth data bit DT12 by using a twelfth buffer B12 of the delay locked loop circuit DLL.

After the data driver 500 reads the twelfth data bit DT12, the data driver 500 reads an eleventh data bit, DT11 by using an eleventh buffer B11 of the delay locked loop circuit DLL. Then, the data driver sequentially reads a tenth data bit DT10, a ninth data bit DT9, an eighth data bit DT8, a seventh data bit DT7, a sixth data bit DT6, a fifth data bit DT5, a fourth data bit DT4, a third data bit DT3, a second data bit DT2, and the first data bit DT1 by using the delay locked loop circuit DLL. The data driver 500 may determine a bit length (e.g., twelve bits in FIG. 6B) of the unit data by using the clock window signal CW.

Figure 7B:
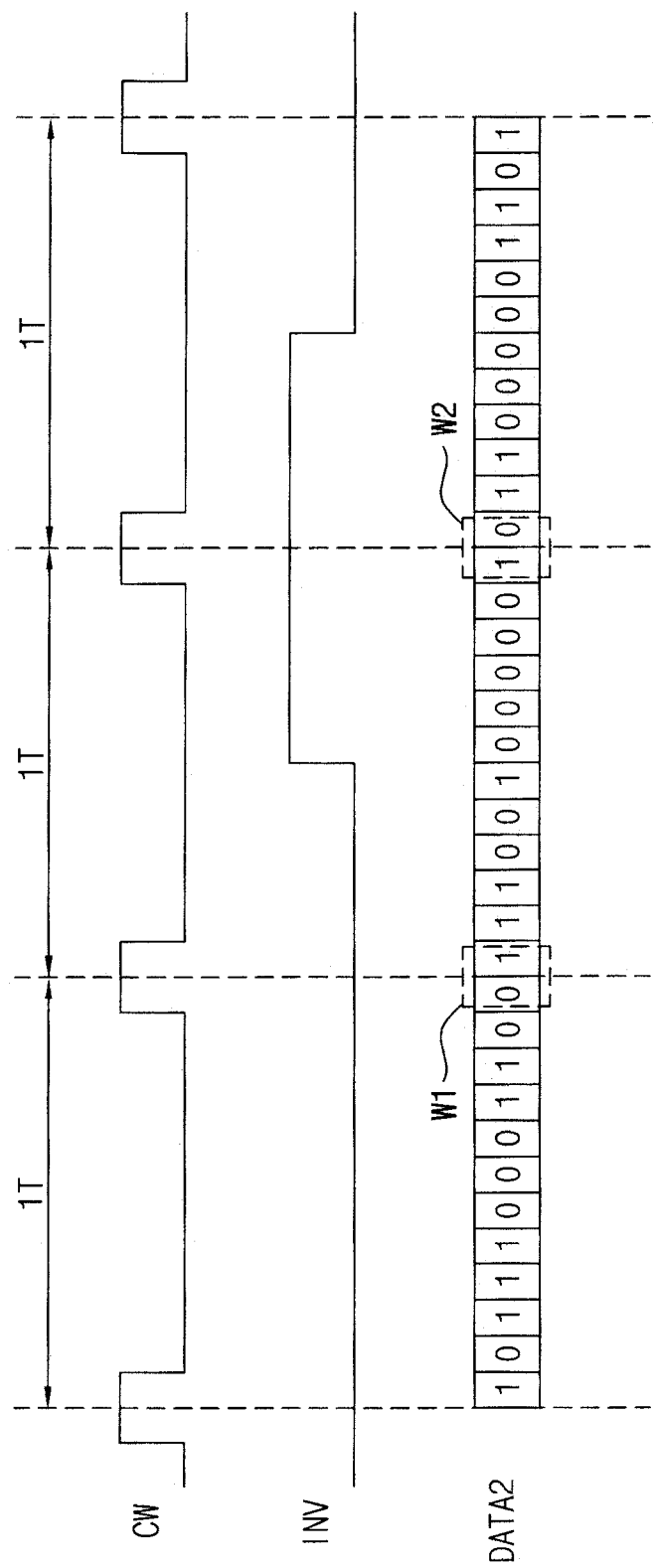
FIG. 7B is a timing diagram illustrating an example of the data signal, from which a clock bit is omitted, generated by the timing controller shown in FIG. 1.
Figure 7C:
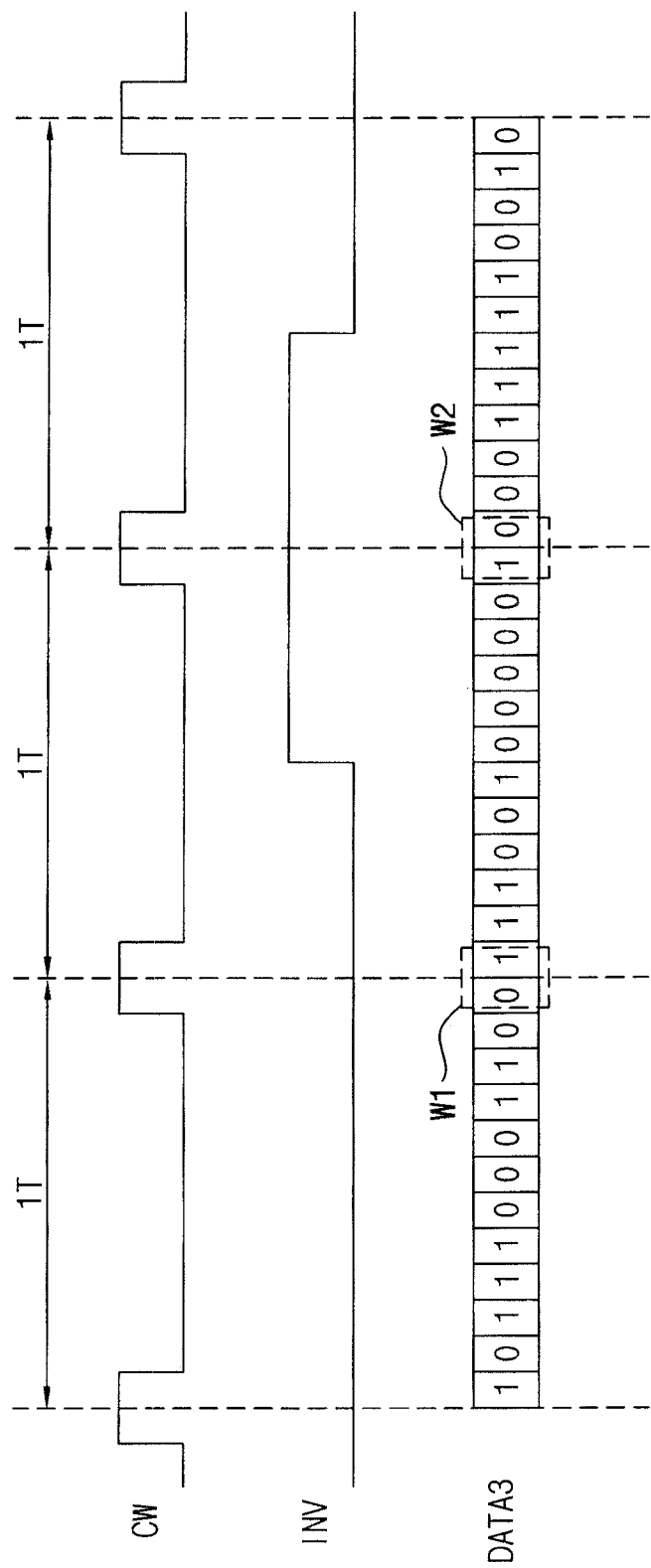
FIG. 7C is a timing diagram illustrating an example of the data signal, from which a clock bit is omitted, generated by the timing controller shown in FIG. 1.

FIG. 7A is a timing diagram illustrating a data signal DATA, from which clock bits are omitted, generated by a timing controller according to a related art example. FIG. 7B is a timing diagram illustrating an example of the data signal DATA, from which clock bits are omitted, generated by the timing controller 200 shown in FIG. 1. FIG. 7C is a timing diagram illustrating an example of the data signal DATA, from which clock bits are omitted, generated by the timing controller 200 shown in FIG. 1.

In the related art example shown in FIG. 7A, the unit data does not include the clock bits as explained with reference to FIG. 4A. In the related art example shown in FIG. 7A, the clock bits CK1 and CK2 are simply omitted from the unit data signal without proper data processing.

In FIG. 7A, first unit data of the first data DATA1 may have bits of 1011 1000 1100, second unit data of the first data DATA1 may have bits of 1110 0101 0001, and third unit data of the first data DATA1 may have bits of 1001 1111 0010.

A last bit (0) of the first unit data and a first bit (1) of the second unit data may correspond to a first window W1, and the last bit (0) of the first unit data and the first bit (1) of the second unit data have different values from each other so that a data driver may normally read the first unit data of the first data DATA1.

A last bit (1) of the second unit data and a first bit (1) of the third unit data may correspond to a second window W2, and because the last bit (1) of the second unit data and the first bit (1) of the third unit data have the same value, the data driver may not normally read the second unit data of the first data DATA1. As explained above, when the clock bits CK1 and CK2 are simply omitted from the unit data signal without proper data processing, two bits at a boundary between the adjacent unit data may have the same value. Thus, a display defect may be generated.

In FIG. 7B, the data received from the data driver 500 is the same as the data received from the data driver in FIG. 7A. However, after omitting the clock bits CK1 and CK2 from the unit data, the unit data is properly processed, different from FIG. 7A. For example, when two bits at a boundary between adjacent unit data have the same value (e.g., at the second window W2 of FIG. 7A), a first bit of the unit data after the boundary is inverted so that the two bits at the boundary between the adjacent unit data have the different values. When two bits at the boundary between the adjacent unit data have different values, neither of the two bits of the unit data is inverted.

In one embodiment, for example as shown in FIG. 7B, when the last bit of the first unit data has the same value as the first bit of the second unit data, all of the bits of the second unit data may be inverted. When the last bit of the second unit data has the same value as the first bit of the third unit data, all of the bits of the third unit data may be inverted.

According to one embodiment, the first unit data of second data DATA2 in FIG. 7B may have bits of 1011 1000 1100, the second unit data of the second data DATA2 may have bits of 1110 0101 0001, and the third unit data of the second data DATA2 may have bits of 0110 0000 1101. Compared to the first data DATA1 of FIG. 7A, the first unit data and the second unit data of the second data DATA2 of FIG. 7B are the same as the first unit data and the second unit data of the first data DATA1 of FIG. 7A but the third unit data of the second data DATA2 of FIG. 7B is inverted with respect to the third unit data of the first data DATA1 of FIG. 7A.

The timing controller 200 may output an inversion notifying signal INV to notify the data driver 500 to invert the third unit data. For example, the last bit of the first unit data is different from the first bit of the second unit data in FIG. 7A so that the second unit data is not inverted and the inversion notifying signal INV is at an inactive level (e.g., a low level) corresponding to the first window W1 at a boundary between the first unit data and the second unit data as shown in FIG. 7B. In contrast, the last bit of the second unit data is the same as the first bit of the third unit data in FIG. 7A so all of the bits of the third unit data are inverted as shown in FIG. 7B. Thus, the inversion notifying signal INV is at an active level (e.g., a high level) corresponding to the second window W2 at a boundary between the second unit data and the third unit data as shown in FIG. 7B.

In the exemplary embodiment shown in FIG. 7C, when the last bit of the first unit data has the same value as the first bit of the second unit data, only the first bit of the second unit data may be inverted. For example, when the last bit of the second unit data has the same value as the first bit of the third unit data, only the first bit of the third unit data may be inverted.

Accordingly, the first unit data of third data DATA3 in FIG. 7C may have bits of 1011 1000 1100, the second unit data of the third data DATA3 may have bits of 1110 0101 0001, and the third unit data of the third data DATA3 may have bits of 0001 1111 0010. The first unit data and the second unit data of the third data DATA3 of FIG. 7C are the same as the first unit data and the second unit data of the first data DATA1 of FIG. 7A and only the first bit of the third unit data of the third data DATA3 of FIG. 7C is inverted with respect to the third unit data of the first data DATA1 of FIG. 7A.

Although all of the bits of the third unit data are inverted in FIG. 7B and only the first bit of the third unit data is inverted in FIG. 7C, the present inventive concept is not limited thereto. For example, some bits of the third unit data, including the first bit of the third unit data, may be inverted when the last bit of the second unit data has the same value as the first bit of the third unit data.

FIG. 8 is a block diagram illustrating a restoring part (e.g., a restoring circuit) of the data driver 500 shown in FIG. 1.

Referring to FIGS. 1-8, when the all of the bits of the third unit data are inverted as explained with reference to FIG. 7B, the restoring part of the data driver 500 restores all of the bits of the third unit data.

The restoring part includes a first storing part (e.g., a first storage circuit or a first memory) 550 that temporarily stores the data DATA1 transmitted from the timing controller 200, a second storing part (e.g., a second storage circuit or a second memory) 560 that stores the restored data DATA2, a first switch SW1 disposed between the first storing part 550 and the second storing part 560 and which is turned on in response to the inversion notifying signal INV being at the inactive level (e.g., the low level), a second switch SW2 disposed between the first storing part 550 and the second storing part 560 and which is turned on in response to the inversion notifying signal INV being at the active level (e.g., the high level), and an inverter 570 disposed between the second switch SW2 and the second storing part 560 that restores the inverted unit data when the second switch SW2 is turned on.

For example, when the timing controller 200 transmits the inverted unit data to the data driver 500, the inversion notifying signal INV is at the active level. The data driver 500 determines the different values in the clock window by using the inverted unit data and determines that the inversion notifying signal INV is at the active level. Thus, the first switch SW1 of the data driver 500 is turned off, the second switch SW2 of the data driver 500 is turned on, and the inverter 570 of the data driver 500 restores the inverted unit data received from the timing controller 200. The restored data is stored in the second storing part 560.

For example, when the timing controller 200 transmits the noninverted unit data to the data driver 500, the inversion notifying signal INV is at the inactive level. The data driver 500 determines the different values in the clock window by the noninverted unit data and determines that the inversion notifying signal INV is at the inactive level. Thus, the second switch SW2 is turned off, the first switch SW1 is turned on, and the noninverted unit data received from the timing controller 200 is stored in the second storing part 560.

The restoring part shown in FIG. 8 may be applied to the exemplary embodiment shown in FIG. 7C. In this embodiment, the restoring part may restore only the first bit of the inverted unit data.

According to exemplary embodiments of the present inventive concept, the timing controller 200 may transmit the data signal to the data driver 500 without the clock signal and the clock bit.

The clock bits are omitted from the data used in the related art clock embedded method so that data bandwidth may be increased. In addition, the clock bits are omitted from the data used in the related art clock embedded method so that power consumption due to data toggling may be reduced. In addition, the data bandwidth is increased so that the number of the driving blocks (e.g., driving ICs) of the data driver may be reduced. Thus, the manufacturing cost of the display apparatus may be reduced.

In addition, the clock bits are omitted from the data used in the related art clock embedded method from a data transmitting cycle viewpoint so that the frequency of data bit transmission may be decreased. Therefore, wireless wide area network noise and electromagnetic interference noise may be reduced. In addition, the clock bits are omitted from the data used in the related art clock embedded method from a data transmitting cycle viewpoint so that the frequency of data bits transmission may be decreased, the jitter margin may be improved, and the reliability of the data may be improved.

Figure 10:
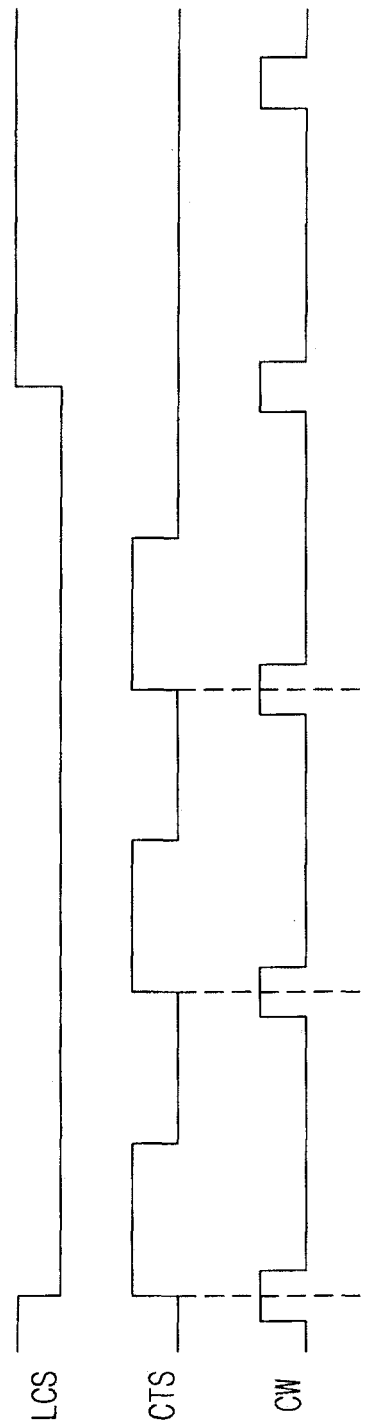
FIG. 10 is a timing diagram illustrating a process of generating a clock window signal by the data driver shown in FIG. 9.
Figure 11:
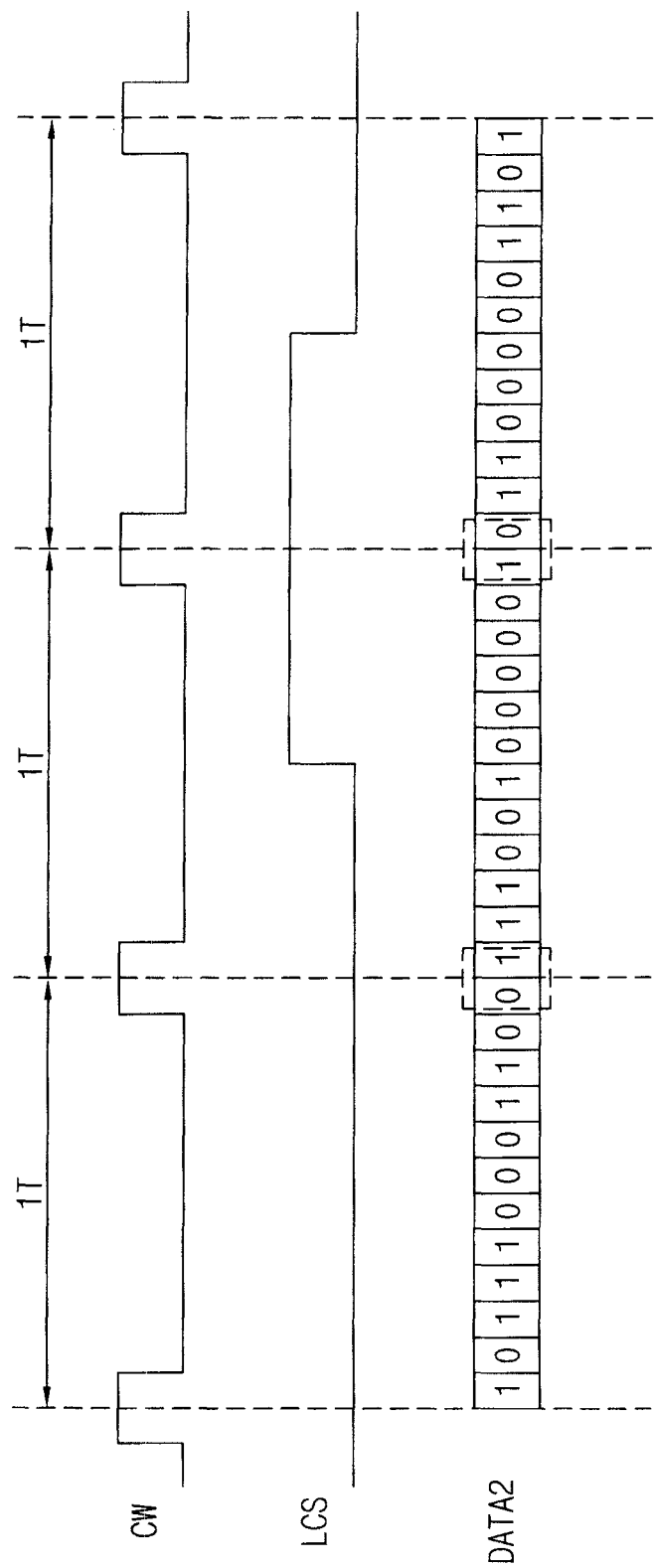
FIG. 11 is a timing diagram illustrating an example of the data signal, from which a clock bit is omitted, generated by the timing controller shown in FIG. 9.

FIG. 9 is a conceptual diagram illustrating a frame structure of a data signal transmitted from a timing controller 200 to a data driver 500 of a display apparatus according to an exemplary embodiment. FIG. 10 is a timing diagram illustrating a process by which the data driver 500 shown in FIG. 9 generates a clock window signal CW. FIG. 11 is a timing diagram illustrating an example of the data signal DATA, from which a clock bit is omitted, generated by the timing controller 200 shown in FIG. 9.

The data transmitting system, the display apparatus, and the method of transmitting the data according to the present exemplary embodiments are substantially the same as the data transmitting system, the display apparatus, and the method of transmitting the data of the previously-described exemplary embodiments explained with reference to FIGS. 1-8 except that the inversion notifying signal is integrated with a lock checking signal. Thus, the same reference numerals will be used to refer to the same or similar parts, components, elements, and/or features as those described with reference to FIGS. 1-8 and repetitive explanation concerning such parts, components, elements, and/or features may be omitted.

Referring to FIGS. 1-11, a driving period of the display panel 100 may include an active period (e.g., ACTIVE PERIOD in FIG. 9) when an image is displayed in a display area of the display panel 100 and a vertical blank period (e.g., VBLANK in FIG. 9) when no image is displayed in the display area.

For example, during the active period, the gate signals are sequentially outputted to the gate lines GL in the display area of the display panel 100, switching elements in the display area are turned on by the gate signals, the data voltages outputted from the data driver 500 are charged to the pixels, and the image is displayed in the display area.

In FIG. 9, an N-th frame may include the active period ACTIVE PERIOD and the vertical blank period VBLANK and an (N+1)-th frame, which is immediately after (e.g., is the next frame after) the N-th frame, may include the active period ACTIVE PERIOD and the vertical blank period VBLANK. Although each frame includes the active period ACTIVE PERIOD and the vertical blank period VBLANK as shown in FIG. 9, the term "frame" may be used to indicate only the active period.

As explained with reference to FIG. 5, the timing controller 200 may output a clock training signal CTS including a clock training pattern to the data driver 500. The clock training pattern may have a high duration and a low duration (e.g., a high-level duration and a low-level duration). The data driver 500 may learn the clock training pattern and may generate the clock window signal CW having a clock window corresponding to a rising edge of the clock training pattern.

Referring to FIG. 10, the timing controller 200 may output a lock checking signal LCS representing the output of the clock training pattern to the data driver 500. When the lock checking signal LCS is received by the data driver 500 at an active level (e.g., a low level), the data driver 500 generates the clock window signal CW.

The clock training may occur during the vertical blank period VBLANK. When the clock training occurs during every vertical blank period VBLANK, the clock window signal CW may be refreshed every frame.

The clock training occurs during the vertical blank period VBLANK, and accordingly, the lock checking signal LCS is also set at the active level and the inactive level during the vertical blank period VBLANK.

As explained with reference to FIGS. 7B and 7C, the timing controller 200 may output the inversion notifying signal INV to notify the data driver 500 of the inversion of the unit data (e.g., inversion of at least a portion of the unit data). The data driver 500 restores the unit data using the restoring part according to the level of the inversion notifying signal INV.

As explained above, the lock checking signal LCS may have a function to notify output of the clock training pattern in the vertical blank period VBLANK. However, the lock checking signal LCS may not have any function in the active period ACTIVE PERIOD.

The inversion notifying signal INV may have a function to notify of the inversion of the unit data in the active period ACTIVE PERIOD. However, the inversion notifying signal INV may not have any function in the vertical blank period VBLANK.

Thus, in the presently-described exemplary embodiment, the lock checking signal, which notifies of the output of the clock training pattern, and the inversion notifying signal, which notifies of the inversion of the unit data, may be integrated as a single signal LCS. For example, the inversion of the unit data is notified of by using the related art lock checking signal LCS so that the data omitting the clock bits may be transmitted without any additional signal, such as the inversion notifying signal INV, and without any additional signal wiring, such as wiring for the inversion notifying signal INV.

According to the presently-described exemplary embodiment, the timing controller 200 may transmit the data signal to the data driver 500 without the clock signal and the clock bit(s).

The clock bits are omitted from the data used in the related art clock embedded method so that data bandwidth may be increased. In addition, the clock bits are omitted from the data used in the related art clock embedded method so that power consumption due to data toggling may be reduced. In addition, the data bandwidth is increased so that the number of the driving blocks (e.g., driving ICs) of the data driver may be reduced. Thus, the manufacturing cost of the display apparatus may be reduced.

In addition, the clock bits are omitted from the data used in the related art clock embedded method from a data transmitting cycle viewpoint so that the frequency of data bits transmission may be decreased. Therefore, wireless wide area network noise and electromagnetic interference noise may be reduced. In addition, the clock bits are omitted from the data used in the related art clock embedded method from a data transmitting cycle viewpoint so that the frequency of data bits transmission may be decreased, the jitter margin may be improved, and the reliability of the data may be improved.

According to the exemplary embodiments of the present inventive concept as explained above, the data may be normally transmitted without the clock signal and the clock bit. Thus, the manufacturing cost of the display apparatus may be reduced and the reliability of the data may be improved.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the aspects and features of the present inventive concept. Accordingly, all such modifications are intended to be included within the scope of the present inventive concept as defined in the claims. It is to be understood that the foregoing is illustrative of the present inventive concept and is not to be construed as limited to the specific exemplary embodiments disclosed herein and that modifications to the disclosed exemplary embodiments, as well as other exemplary embodiments, are intended to be included within the scope of the appended claims and their equivalents. The present inventive concept is defined by the following claims and their equivalents.

What is claimed is:

1. A data transmitting system comprising:
a transmitter configured to transmit first unit data having a first bit length and second unit data sequentially with the first unit data and having the first bit length; and
a receiver configured to receive the first unit data and the second unit data,
wherein the transmitter is configured to transmit the second unit data to the receiver when a last bit of the first unit data and a first bit of the second unit data have different values from each other,
wherein the transmitter is configured to invert the first bit of the second unit data and transmit the second unit data having the inverted first bit to the receiver when the last bit of the first unit data and the first bit of the second unit data have the same value as each other,
wherein the transmitter is configured to output an inversion notifying signal notifying the receiver of the inversion of the second unit data to the receiver when the last bit of the first unit data and the first bit of the second unit data have the same value as each other, and
wherein the first bit length is greater than 1.

2. The data transmitting system of claim 1, wherein the transmitter is configured to invert all bits of the second unit data and transmit the second unit data having the inverted bits to the receiver when the last bit of the first unit data and the first bit of the second unit data have the same value.

3. The data transmitting system of claim 1, wherein the transmitter is configured to invert only the first bit of the second unit data and transmit the second unit data having the inverted first bit to the receiver when the last bit of the first unit data and the first bit of the second unit data have the same value.

4. The data transmitting system of claim 1, wherein the receiver comprises a restoring circuit configured to restore the first bit of the second unit data when the first bit of the second unit data is inverted.

5. The data transmitting system of claim 4, wherein the restoring circuit comprises:
a first storing circuit configured to temporarily store the second unit data transmitted from the transmitter;
a second storing circuit configured to store the restored second unit data;
a first switch between the first storing circuit and the second storing circuit and configured to be turned on in response to an inactive level of the inversion notifying signal;
a second switch between the first storing circuit and the second storing circuit and configured to be turned on in response to an active level of the inversion notifying signal; and
an inverter between the second switch and the second storing circuit and configured to restore the first bit of the second unit data when the second switch is turned on.

6. The data transmitting system of claim 1, wherein the receiver is configured to generate a clock window signal having a window corresponding to the last bit of the first unit data and the first bit of the second unit data.

7. The data transmitting system of claim 6, wherein the receiver is configured to read the first unit data from the last bit of the first unit data to a first bit of the first unit data by the first bit length by using a delay locked loop circuit when the last bit of the first unit data and the first bit of the second unit data in the window have different values.

8. The data transmitting system of claim 7, wherein the delay locked loop circuit comprises a plurality of buffers connected with each other in series.

9. The data transmitting system of claim 6, wherein the first unit data and the second unit data are transmitted during an active duration,
wherein a vertical blank duration is between two adjacent active durations, and
wherein the clock window signal is generated by a clock training pattern signal transmitted from the transmitter to the receiver during the vertical blank duration.

10. The data transmitting system of claim 9, wherein a lock checking signal representing output of the clock training pattern signal and an inversion notifying signal notifying the receiver of the inversion of the second unit data is generated as a single signal.

11. A display apparatus comprising:
a display panel configured to display an image;
a gate driver configured to output a gate signal to a plurality of gate lines of the display panel;
a data driver configured to output a data voltage to a plurality of data lines of the display panel; and
a timing controller configured to output a first control signal to the gate driver and to output a second control signal and a data signal corresponding to the data voltage to the data driver,
wherein the timing controller is configured to transmit first unit data having a first bit length and second unit data sequentially with the first unit data and having the first bit length,
wherein the data driver is configured to receive the first unit data and the second unit data,
wherein the timing controller is configured to transmit the second unit data to the data driver when a last bit of the first unit data and a first bit of the second unit data have different values from each other,
wherein the timing controller is configured to invert the first bit of the second unit data and transmit the second unit data having the inverted first bit to the data driver when the last bit of the first unit data and the first bit of the second unit data have the same value as each other,
wherein the timing controller is configured to output an inversion notifying signal notifying the data driver of the inversion of the second unit data to the data driver when the last bit of the first unit data and the first bit of the second unit data have the same value as each other, and
wherein the first bit length is greater than 1.

12. The display apparatus of claim 11, wherein the timing controller is configured to not output a clock signal swinging between a high level and a low level to the data driver.

13. The display apparatus of claim 12, wherein the first unit data and the second unit data do not comprise a clock bit.

14. The display apparatus of claim 11, wherein the data driver comprises a restoring circuit configured to restore the first bit of the second unit data when the first bit of the second unit data is inverted.

15. The display apparatus of claim 14, wherein the restoring circuit comprises:
a first storing circuit configured to temporarily store the second unit data transmitted from the timing controller;
a second storing circuit configured to store the restored second unit data;

a first switch between the first storing circuit and the second storing circuit and configured to be turned on in response to an inactive level of the inversion notifying signal;

a second switch between the first storing circuit and the second storing circuit and configured to be turned on in response to an active level of the inversion notifying signal; and an inverter between the second switch and the second storing circuit and configured to restore the first bit of the second unit data when the second switch is turned on.

16. A method of transmitting data, the method comprising:

comparing, by a transmitter, a last bit of first unit data having a first bit length to a first bit of second unit data output sequentially with the first unit data and having the first bit length;

transmitting, by the transmitter, the first unit data to a receiver;

when the last bit of the first unit data is different from the first bit of the second unit data, transmitting, by the transmitter, the second unit data to the receiver;

when the last bit of the first unit data is the same as the first bit of the second unit data, inverting, by the transmitter, the first bit of the second unit data and transmitting, by the transmitter, the second unit data having the inverted first bit to the receiver; and when the last bit of the first unit data and the first bit of the second unit data have the same value, outputting, by the transmitter, an inversion notifying signal notifying a data driver of the inversion of the second unit data to the data driver, wherein the first bit length is greater than 1.

17. The method of claim 16, further comprising:

transmitting, by the transmitter, a clock training pattern to the receiver before the comparing of the last bit of the first unit data to the first bit of the second unit data; and generating, by the receiver, a clock window signal having a window corresponding to the last bit of the first unit data and the first bit of the second unit data based on the clock training pattern.

18. The method of claim 17, further comprising:

comparing, by the receiver, the last bit of the first unit data and the first bit of the second unit data in the window;

determining, by the receiver, a boundary between the first unit data and the second unit data when the last bit of the first unit data and the first bit of the second unit data in the window are different from each other;

reading, by the receiver, the first unit data based on the boundary between the first unit data and the second unit data;

outputting, by the transmitter, the inversion notifying signal when the last bit of the first unit data is the same as the first bit of the second unit data; and restoring, by the receiver, the second unit data in response to the inversion notifying signal.

\* \* \* \* \*